United States Patent Office 3,245,817
Patented Apr. 12, 1966

3,245,817
RESINOUS COMPOSITION CONTAINING
ANTIMIGRATION AGENT
Donald E. Lovness, Stillwater, Minn., assignor to Minnesota Mining and Manufacturing Company, St. Paul, Minn., a corporation of Delaware
No Drawing. Filed July 14, 1961, Ser. No. 126,444
13 Claims. (Cl. 106—279)

The present invention relates to a resinous composition of matter. In one aspect, the present invention relates to a resinuous composition of matter containing an organic material which tends to migrate from the composition and the method of preventing such migration. In still another aspect, the invention relates to new thermoplastic compositions useful as an article of manufacture, such as films, adhesive tape backings, asphalt roofing shingles, asphalt laminated paper and asphalt paving compositions.

Thermoplastic solid resinous materials are utilized for various purposes in the art. For example, thermoplastic materials are useful as self-supporting films, backing for adhesive tapes, molded articles, binders, substrates or backing for adhesives and protective coatings. Many solid resinous materials have incorporated therein a plasticizer to maintain the material pliant and to prevent brittleness and cracking. In addition, many synthetic thermoplastic resinous materials inherently contain oily materials or low molecular weight materials by virtue of the manner in which the thermoplastic material is manufactured. Similarly, many natural thermoplastic resins normally contain low molecular weight oily materials which are desirable to be retained therein. Asphalts, for example, which are natural thermoplastic resins, contain heavy oils. These plasticizers and oils, while having certain advantages in the thermoplastic resin, tend to migrate from the resin during the use or ageing of the resin. In the case of plasticizers, the migration of the plasticizer out of the synthetic resin results in a less pliable and more brittle film or coating. On the other hand, in the case of certain natural resins, such as asphalt, the migration of the oil from the resin results in staining of objects coming in contact with the asphalt. It is much to be desired, therefore, to provide a composition which will prevent migration of the oil or plasticizer from the thermoplastic resin.

An object of this invention is to provide a stable solid resinous composition containing an oleaginous material.

Still another object of this invention is to provide a stable composition of a solid organic resin containing a plasticizer.

Still another object of this invention is to provide a method for preventing the migration of plasticizers and low molecular weight materials from an organic solid resinous mass.

Yet another object is to provide a non-staining asphalt composition.

Another object is to provide stable synthetic plasticized films and coatings.

Various other objects and advantages of the present invention may become apparent from the accompanying description and disclosure to those skilled in the art without departing from the scope of this invention.

The prevent invention comprises a mixture of a normally solid organic material, an oleaginous material compatible with said organic material, and an antimigration component comprising an organic compound soluble in said oleaginous material and having an oleophobic terminal portion. The solid organic resinous material imparts to the resulting mass the normally solid characteristics thereof. The solid mass may be in the form of a solid solution, a gel, or a solid colloidal suspension in which the components are intimately mixed. The oleaginous material, which is included in the solid mass in the form of a homogenous mixture therewith, is present by the addition thereof to the solid mass, such as when it is a plasticizer, or is incorporated during the manufacture of the resinous material, or is present by virtue of the source of the resin, such as natural resins. The oleaginous material is compatible with the resinous material and is usually miscible therewith. In addition, the oleaginous material is liquefiable at a temperature at which the resinous material still remains solid. In this aspect, the oleaginous material may be liquid under ambient conditions. On the other hand, the oleaginous material may, under ambient conditions, be solid or waxy, but at the temperature of use of the solid composition, the oleaginous material becomes liquid. In either of the above cases, the oleaginous material, when liquid, has a tendency to migrate from the solid mass to the surface of the mass. The antimigration component of the solid mass has the effect of preventing or retarding the migration of the liquid oleaginous material from the solid mass.

The antimigration component may be added to or incorporated in the oleaginous material when the oleaginous material is in a liquid state by dissolution. This dissolution of the antimigration component in the oleaginous material is readily and easily effected when the oleaginous material is liquid at ambient temperature. However, when the oleaginous material is solid or waxy at ambient temperature, the mixture containing oleaginous material is heated to a high enough temperature to liquefy the entire mixture or at least liquefy the oleaginous material, thereby dissolving the antimigration component therein. When the mass is cooled down, the antimigration component may still be dissolved in the oleaginous material, even though oleaginous material is in the solid or waxy state, but in any event, it is uniformly dispersed in the oleaginous phase of the solid mass. In the case of waxy oleaginous materials, incorporation may also be effected by dissolving the antimigration component in an organic solvent compatible with the oleaginous material.

The antimigration component contains a fluorine-containing oleophobic terminal portion. Another portion of the antimigration component is oleophilic and soluble in the oleaginous material. When the oleaginous material is in a liquid state, the antimigration component, itself, tends to migrate to the surface of the mass and orient in such a manner that the oleophilic portion of the antimigration compound remains dissolved in the oleaginous material, whereas the oleophobic terminal portion is projected from the oleaginous phase on the surface of the solid mass and forms an effective barrier, preventing or retarding migration of the oleaginous material from the surface of the solid mass.

The resinous materials of the compositions of the present invention are thermoplastic organic resins which are normally solid. These resinous materials are solid at a temperature of about 25° C., usually 50° C. or higher and are of the film-forming type. The preferred resinous materials are linear in structure and polymeric. In view of the fact that the antimigration material contains fluorine, the class of materials to which the present invention is particularly applicable are those solid resinous materials and polymers which contain no fluorine or only a minor amount of fluorine. The resinous materials included in the present invention are both natural and synthetic resins. The natural resins include bitumens such as petroleum asphalt, Gilsonite and naphtha, carnauba wax, candelilla wax, montan wax, paraffin wax, beeswax, terpene resins, shellac, pine-tar pitch, coal-tar pitch and cellulose acetate fibers and films.

The synthetic resins or polymers include an extensive group of synthetic resinous materials. Typical examples include the synthetic vinyl resins, such as polyvinyl chloride, polyvinylidene chloride, polyvinyl fluoride, polyvinylidene fluoride, polyvinyl acetate, polystyrene, polybutadiene, polypropylene, polyethylene, polyisoprene, polyacrylonitrile and polyacrylic acid; copolymers of styrene and butadiene; copolymers of vinyl chloride and vinyl acetate; copolymers of butadiene and acrylonitrile; copolymers of isobutylene and butadiene.

Other polymers which may constitute the resinous material include the acrylate resins such as polymethacrylates; condensation polymers such as polyethylene terephthalate, polyethylene isophthalate, polyhexamethylene adipamide, polypyrrolidone, polyurethane, polyhexamethylene sebacamide, polycaprolactam, polydecamethylene adipamide, copolymers of ethylene terephthalate and ethylene isophthalate and copolymers of hexamethylene adipamide and caprolactam; the silicons such as polymers of dimethyl diethoxysilane; polymers of dimethyl dichlorosilane and polymers of diphenyl diethoxysilane; the epoxy resins which include diglycidyl ether of bis-phenol A (bis[4-hydroxy phenol] dimethyl methane), of dis(4-hydroxyl phenol)methane, of 4,4′dehydroxy biphenol, of 4,4′dihydroxy diphenol sulfene; and the phenol aldehyde resins which include polyformaldehyde resins, cresol formaldehyde resins, resorcinol resins and cashew nut shell liquid formaldehyde resins.

The oleaginous material which is present in the composition, a previously stated, are those materials which are compatible with the above-mentioned solid resins. These materials may be added to the resinous material or may already be present therewith. The oleaginous material is liquefiable at a temperature at which the solid resinous material still remains solid. Typical examples of these oleaginous materials include conventional plasticizers for resins and polymers such as diethylene glycol diacetate, dioctyl phthalate, diacetin, tricresyl phosphate, dibutyl phthalate, butyl phthalyl butyl glycolate, methyl phthalyl ethyl glycolate, trimethylene glycol di-2-ethyl hexoate, trimethylene glycol di-2-ethyl butyrate and tributoxyethyl phosphate.

The above plasticizers are usually employed with the synthetic polymers or resins which constitute the solid resinous material, in particular the vinyl polymers.

The natural oils, greases and waxes which are present in the natural resins also constitute the oleaginous material. These natural materials are usually low molecular weight polymers or compounds having similar structure to the natural resinous material. In the case of asphalt, the oleaginous material constitutes a normally liquid bitumen oil. Also the oleaginous material may constitute low molecular weight telomers of the corresponding resinous or polymeric solid material. The oleaginous material may also constitute hydrocarbon oils and greases, both aliphatic and aromatic, including hydrocarbon tars.

The oleaginous materials are usually present in the composition within an amount between about 1 and about 90 weight percent of the solid resinous material. The higher percentages of oleaginous material are usually experienced in those cases where the solid mass is a gel. The lower percentages are characteristic of a solid solution or a colloidal suspension of oleaginous material and solid resinous material.

The antimigration material must be soluble in the oleaginous material and is actually dissolved therein when the oleaginous material is in the liquid state. The antimigration component has an oleophobic terminal portion containing fluorine. The preferred antimigration materials may be represented by the following typical formula:

(1)  Y(CFZ)ₓ(R)

in which Y is hydrogen, chlorine or fluorine, Z is a normally gaseous halogen (chlorine or fluorine), and $x$ is an integer of at least 4 and preferably not greater than about 12. $Y(CFZ)_x$ is the oleophobic terminal portion of the molecule and may be acyclic or alicyclic. R is the oleophilic organic radical of the antimigration component and contains at least one hydrocarbon alkyl radical. When R contains only one hydrocarbon alkyl radical, this radical has preferably at least 2 carbon atoms. The oleophilic organic radical is preferably non-fluorinated.

Examples of the preferred antimigration compounds include compounds of the following general formulae:

(2) 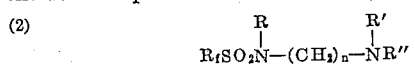

such as

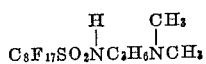

and

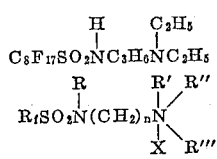

(3) 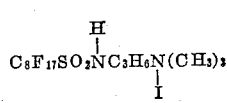

such as

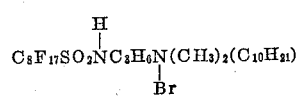

and

(4) 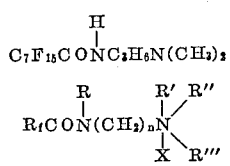

such as

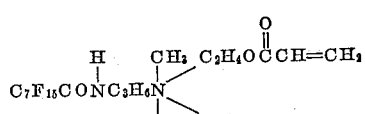

(5) 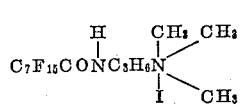

such as

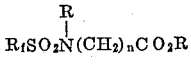

and

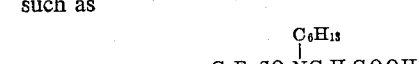

(6) 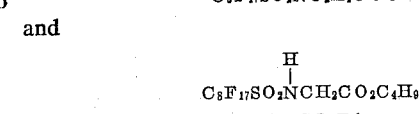

such as $C_8F_{17}SO_2NC_2H_4COOH$ and

(7)  $R_fCO_2R'$ such as $C_7F_{15}CO_2C_6H_{13}$ in which $R_f$ is a fluorinated alkyl radical having from 4 to 12 carbon atoms, preferably perfluorinated, in which R is an hydrocarbon alkyl radical of not more than about 6 carbon atoms or hydrogen, in which R', R" and R'" are organic radicals, preferably hydrocarbon alkyl radicals, having from 1 to 12 carbon atoms, at least one of which is a hydrocarbon alkyl radical, in which X is a halogen selected from the group consisting of bromine, iodine and chlorine, and in which $n$ is an integer of not more than about 6, preferably not more than 4.

The antimigration component is utilized in the overall composition in an amount by weight between about 5 and about 1000 parts per million.

The compositions of the present invention are particularly useful in the preparation of thermoplastic tapes and films which include an oleaginous plasticizer. The antimigration agent prevents or minimizes the bleeding of the plasticizer from the film or tape. In the case of films, the retention of the plasticizer prevents brittleness and ageing of the film. When such films are used to make pressure-sensitive adhesive tape, the antimigration agent prevents the plasticizer from bleeding into the adhesive coating, which bleeding of the plasticizer causes loss of adhesiveness of the tape.

The incorporation of the antimigration component into asphalt prevents or minimizes the bleeding of low molecular weight oils from the asphalt composition. When asphalt is used for coating felt and the coated felt is then covered with roofing granules to make composition roofing, the antimigration component prevents the staining of the roofing granules due to bleeding of the oil from the asphalt. Similarly, asphalt-laminated paper utilizing the antimigration component results in a substantially stain-free laminate which does not discolor on ageing and does not stain materials coming into contact with the paper laminate. The use of asphalt as a surface-coating is improved by the use of the antimigration component. For example, on roadways the oily materials of the asphalt do not bleed to the surface of the roadway, thereby preventing or minimizing staining of materials in contact with the surface as well as increasing the life and weatherability of the roadway. The inclusion of the antimigration agent in acrylic paints minimizes the flaking and weathering of the dried paint. The inclusion of the antimigration agent in the composition for preparing molded articles minimizes crazing of the resulting molded article. The inclusion of the antimigration agent in resinous caulking compounds substantially prevents drying out of the caulking material, resulting in an increase in the life of the material. The use of the antimigration agent in certain synthetic fibers minimizes the loss of plasticizer during dry-cleaning, thus resulting in increased life of the fabric, or fibers. A linoleum backing of asphalt felt is improved by including the antimigration agent in the asphalt because the discoloration often observed in linoleum on ageing is minimized. Lacquers and lithographic inks are also improved by inclusion of antimigration agents of this invention. Organosol suspension of polymers and waxes are also improved by the inclusion of an antimigration agent in the composition since it prevents discoloration of the surfaces to which the waxes are applied.

A layer or film of resinous compositions of this invention containing an antimigration agent overlying another resinous layer which has a tendency to bleed plasticizer or oils therefrom forms an effective barrier to prevent bleeding of the underlying layer.

The following examples are offered as a better understanding of the present invention and show the application and results of the incorporation of an antimigration agent or component into various compositions for various uses.

EXAMPLE 1

Mid-Continent asphalt (ASTM D5–25 penetration; 20) was heated to 400° F. and approximately 0.1 percent by weight of the antimigration agent shown in Table I below was added to separate batches of the asphalt at the above temperature. The separate batches of asphalt were then coated on separate pieces of rag-content felt. A control sample of the same asphalt was prepared without the use of an antimigration agent. The asphalt-coated felt samples were then exposed at 160° F. under an ultraviolet lamp for 24 days and washed each day with methyl alcohol. The results of the weathering test are shown in Table I under "Weatherability." Stain tests were also made after 4 days. The test samples for this test were made similarly to the sample for the weatherability tests, except that the coated felt was reheated and then coated with roofing granules (mineral). The samples were then placed in an infrared oven for 4 days at 160° F. and rated on the amount of the discoloration of the roofing granules that took place at the end of 4 days. Rating numbers are from 1 to 10, 1 being the best rating (least discoloration), and 10 being the worst rating (most discoloration).

Table I

| Sample No. | Antimigration agent: | Weather ability | Stain test |
|---|---|---|---|
| Control | | (1) | 9 |
| 1 | $C_8F_{17}SO_2NHC_3H_6N(CH_3)_2(C_4H_9)Br$ | Good | 2 |
| 2 | $C_7F_{15}CONHC_3H_6N(CH_3)_3I$ | do | 2 |
| 3 | $C_8F_{17}SO_2NHC_3H_6N(CH_3)_2(C_{10}H_{21})Br$ | Excellent | 1 |
| 4 | $C_8F_{17}SO_2NHC_3H_6N(CH_3)_2$ | Good | 2 |
| 5 | $C_7F_{15}CONHC_3H_6N(CH_3)_2$ | do | 2 |
| 6 | $C_7F_{15}CONHC_3H_6N(CH_3)_2(C_2H_4COCH=CH_2)Cl$ | Excellent | 1 |

[1] Badly weathered, many cracks, very brittle.

EXAMPLE 2

This example relates to the use of the antimigration agent of this invention in preventing exudation of oil from asphalt. The tests were carried out in accordance with standard procedure of ASTM D–1370–58. The coating asphalt to be tested is heated in a small 3-ounce tin to form a flat surface of asphalt. The surface of the coating asphalt is then dusted with roofing talc (about 50 microns in particle size) which is evenly distributed over the surface of the asphalt. A drop of saturant asphalt is placed on the talc surface. The tin is then exposed in an oven at 110° F. for a period of 72 hours. Exudation from the saturant asphalt will appear as a brown ring on the talc surface around the drop of the saturant asphalt, and the saturant asphalt drop will flatten, resulting from an excess of low molecular weight oils congregating at the interface between the saturant drop and the coating asphalt base. The low molecular weight oils originate in the asphalt saturant drop. The following combinations of asphalt coating and asphalt saturant were tested in which either the coating asphalt or the saturant asphalt contained the antimigration agent, $C_8F_{17}SO_2NH(CH_2)_3N(CH_3)_2(C_{10}H_{21})Br$. The antimigration agent was dissolved in the asphalt in an amount of 0.1 percent by heating the asphalt to 350° F. prior to testing. The following letters indicate the type of asphalt utilized for the tests. The letter F indicates that the asphalt represented by the preceding letter contained the above antimigration agent dissolved therein.

A—Mid-Continent saturant asphalt (ASTM D5–25 penetration: 50–60)
B—California saturant asphalt (ASTM D5–25 penetration: 50–60)
C—Mid-Continent coating asphalt (ASTM D5–25 penetration: 20)
D—California coating asphalt (ASTM D5–25 penetration: 20)

*Table II*

| Combination of asphalt components: | Results of tests |
|---|---|
| A+C | Good. |
| AF+C | Very good. |
| A+CF | Do. |
| A+D | Bad. |
| AF+D | Fair. |
| A+DF | Very good. |
| B+D | Bad. |
| BF+D | Very good. |
| B+DF | Do. |
| B+C | Good. |
| BF+C | Very good. |
| B+CF | Do. |

Those tests in which a dark brown stain appeared on the talc and flattening of the drop was quite apparent are indicated as "Bad." Those tests in which substantially no brown stain was observed and no flattening of the drop occurred are classed as "Very good."

EXAMPLE 3

This example demonstrates the improved resistance of polyvinyl chloride plastic film to the loss of plasticizer, using an antimigration agent of the present invention. The film was prepared by admixing 65 weight percent of dispersion grade polyvinyl chloride plastic (specific viscosity, 0.60; molecular weight, about 100,000 or higher) with approximately 35 weight percent dioctyl phthalate (plasticizer) and about 0.01 weight percent based on the plasticizer of $C_8F_{17}SO_2NH(CH_2)_3N(CH_3)_2(C_{10}H_{21})Br$ (antimigration agent). The mixture was milled at 35° F. to form a 30-mil thick film. A control sample which contained no antimigration agent was similarly prepared. The control sample and the sample containing the antimigration agent were placed in a bottle containing heptane as a solvent and shaken for 2 hours. The film samples were removed from the bottle and dried at 140° F. for 45 minutes. The weight of the film was taken before and after the treatment with heptane. The greatest loss in weight indicates the greatest loss of plasticizer by extraction. Table III below indicates the results of the test.

*Table III*

| | Percent loss in weight | |
|---|---|---|
| | Control | Treated sample |
| (a) After initial drying | 9.5 | 4.3 |
| (b) After 12 hours at room temperature | 14.8 | 7.1 |
| (c) After 24 hours at room temperature | 16.9 | 8.9 |
| (d) After 64 hours | 22.2 | 10.5 |

EXAMPLE 4

This example shows the effect of antimigration agents on paper asphalt laminates. The antimigration agents prevented or minimized oils or other mobile components of the asphalt from migrating to the surface of the asphalt and causing staining of the paper. In accordance with this example, the antimigration agents listed below were added in the amount shown below as solutions in isopropanol (an aid in the distribution of the anti-migration agent) to hot melts of Mid-Continent asphalt (ASTM D5–25 penetration: 21). Separate melts were made for each antimigration agent and the control sample. The paper laminate was prepared by rolling out a puddle of the asphalt melt at 300° F. between sheets of 30-pound weight unsized bleached kraft paper.

Laminates:
(1) Control (no antimigration agent)
(2) 0.1% $C_8F_{17}SO_2NHC_2H_4N(C_2H_5)_2$
(3) 0.05% $C_8F_{17}SO_2NHC_2H_4N(C_2H_5)_2$
(4) 0.025% $C_8F_{17}SO_2NHC_2H_4N(C_2H_5)_2$
(5) 0.125% $C_8F_{17}SO_2NHC_2H_4N(C_2H_5)_2$
(6) 0.0063% $C_8F_{17}SO_2NHC_2H_4N(C_2H_5)_2$
(7) 0.025% $C_8F_{17}SO_2NHC_3H_6N(CH_3)_2(C_{10}H_{21})Br$ The seven different laminates above were exposed in an oven at 140° F. and at 150° F. for specific periods of time as indicated below in Table IV. The results of the test were measured by visual examination and reflectometer readings.

*Table IV*

| Sample | Test period | Reflectometer reading | | | | Visual Test 1, only |
|---|---|---|---|---|---|---|
| | | Initial | | Change | | |
| | | Test 1 | Test 2 | Test 1 | Test 2 | |
| 1 (Control) | Initial | 56.5 | 55.0 | | | White. |
| 2 | do | 55.0 | 54.5 | | | Do. |
| 3 | do | 55.0 | 55.0 | | | Do. |
| 4 | do | 55.5 | 55.0 | | | Do. |
| 5 | do | 56.0 | 55.5 | | | Do. |
| 6 | do | 57.5 | 53.5 | | | Do. |
| 7 | do | 57.0 | 54.5 | | | Do. |
| 1 (Control) | 2 days (140° F.) | | | 18.0 | 16.5 | Yellow. |
| 2 | do | | | 2.5 | 0 | Unstained. |
| 3 | do | | | 2.0 | 0 | Do. |
| 4 | do | | | 9.5 | 1.5 | Slight yellow. |
| 5 | do | | | 16.5 | 14.5 | Yellow. |
| 6 | do | | | 16.5 | 12.5 | Do. |
| 7 | do | | | 1.5 | 0 | Unstained. |
| 1 (Control) | 5 days (140° F.) | | | 27.5 | 26.5 | Brown. |
| 2 | do | | | 3.0 | 0 | Unstained. |
| 3 | do | | | 4.5 | 0.5 | Stained at crease. |
| 4 | do | | | 21.0 | 7.5 | Mottled, yellow. |
| 5 | do | | | 26.5 | 27.5 | Strong yellow. |
| 6 | do | | | 26.5 | 25.5 | Do. |
| 7 | do | | | 2.5 | 0.2 | Unstained. |
| 1 (Control) | 45 days (140° F.) | | | | | Black. |
| 2 | do | | | | | Unstained. |
| 3 | do | | | | | Brown. |
| 4 | do | | | | | Do. |
| 7 | do | | | | | Unstained. |

Test No. 1 was started the same day the laminates were made up. Test No. 2 was started after five days to allow time for the antimigration agent to orient at room temperature. The change in reflection is a measure of the surface of the sample—the smaller the change, the less darkening of the surface. From the table, it is evident that the antimigration agents definitely minimized staining of the laminates even at temperatures as high as 140° F.

EXAMPLE 5

This example shows the improved stain-resistance and adhesion of asphalt roofing tile when the asphalt contains an antimigration agent in accordance with the present invention.

A 50:50 weight mixture of a quaternary amine as a cathionic surfactant and $$C_8F_{17}SO_2NHC_3H_6N(CH_3)_2(C_{10}H_{21})Br$$

as the antimigration agent was sprayed onto molten asphalt (350° F.) in an amount calculated to give 0.01 weight percent of the antimigration agent based on the asphalt. Roofing granules comprising silica coated with sodium silicate were then sprinkled on the molten surface, and then the molten surface was cooled. The cool asphalt samples were then "picked" dry after 2 hours and after 18 hours of soaking in water. The percent "pick" shown in Table V below corresponds to the percent area covered with roofing granules that were actually imbedded in the asphalt.

A portion of the above asphalt melt was coated on asphalt-saturated rag-content felt. The coated felt was then reheated to 350° F. and coated with the above roofing granules. The coated felt samples were placed in an infrared oven for 4 days at 160° F. and rated on the amount of discoloration that had taken place at the end of 4 days. The results of this test are shown as the "Stain Test" in Table V.

The control samples were prepared in the same manner as the treated samples above, except the control samples contained no antimigration agent.

Table V

| Sample | Pick test, percent | | | Stain test rating |
|---|---|---|---|---|
| | Dry | 2-hour | 18-hour | |
| Control | 85 | 0 | 0 | Heavy stain. |
| Treated | 94 | 89 | 77 | No stain. |

EXAMPLE 6

This example demonstrates the effect of the antimigration agent of this invention in preventing or minimizing staining of asphalt linoleum and floor tile.

Rag-content felt used as a backing for linoleum was saturated with a Mid-Continent asphalt (ASTM D5–25 penetration: 21). The asphalt-felt backing was heated to about 320° F. to cause the asphalt to become molten. On the molten asphalt of separate felt samples, 0.002 weight percent of a solution antimigration agent in isopropanol was swabbed whereby the antimigration agent was dissolved in the asphalt. The asphalt-felt containing the antimigration agent was cooled and allowed to dry. Talc was dusted on the surface of the dried and treated felt, as well as on a control sample which was similarly prepared as above except no antimigration agent was dissolved in the asphalt. The control sample and the treated sample of felt backing were exposed in an oven at 200° F. to 220° F. for the periods shown in Table VI below. The samples of felt were folded in half and an approximately 3½-pound per square inch weight placed upon the folded felt during the heating periods. Table VI below shows the results of the test.

Table VI

| Sample—Antimigration agent | Appearance of talc | | |
|---|---|---|---|
| | After 2 hours | After 1 day | After 1 week |
| Control | Slight stain | Black | Black. |
| Treated— $C_8F_{17}SO_2NHC_3H_6N(CH_3)_2(C_{10}H_{21})Br$ | Unstained | Unstained | Unstained. |
| Treated— $C_8F_{17}SO_2NHC_3H_6N(CH_3)_2$  | do | do | Do. |
| Treated— $C_7F_{15}CONHC_3H_6N(CH_3)_2(C_2H_4COCH=CH_2)Cl$ | do | Slight stain | Slight stain. |

The above tests correlate the results of asphalt linoleum rolled up tightly, or stacked asphalt tile. The performance indication was exceptional for the treated samples.

EXAMPLE 7

This example indicates the improvement in pressure-sensitive adhesive tapes utilizing an antimigration agent in the tape backing. According to this example, 100 parts by weight of a powdered copolymer of vinyl chloride and vinyl acetate (97:3 by weight) were admixed with 35 parts by weight of dioctyl phthalate and 1.5 parts by weight of di-basic lead phosphite admixed and thoroughly blended in a blending mill. The mixture was then divided into three parts. Into two of the separated parts were added, respectively, approximately 0.06 weight percent of $C_8F_{17}SO_2NH(CH_2)_3N(CH_3)_2(C_{10}H_{21})Br$ and $$C_7F_{15}CONH(CH_2)_3N(CH_3)_2(CH_2CH_2OCOCH=CH_2)Cl$$

The separate parts were then extruded into film. The film was then coated with a styrene-butadiene copolymer rubber adhesive. The films were then rolled and tested for unwind characteristics. In addition, the films were tested for adhesion to steel at fast speed for fresh tape and aged tape. The results were very significant in regard to the treated samples in that the treated samples exhibited a very smooth roll unwind. As compared to the control sample, the treated films had an increase of 45 percent in adhesion to steel at fast speeds on fresh samples and 21 percent on aged samples.

Various applications and use of the antimigration agent in various articles of manufacture utilizing resinous materials will become apparent to those skilled in the art without departing from the scope of the present invention.

Having described my invention, I claim:

1. The method for inhibiting the migration of the natural low molecular weight oleaginous material from solid asphalt containing same which comprises dissolving in said natural oleaginous material between about 5 and about 1000 parts per million of an organic compound having an oleophobic fluorine-containing terminal portion of at least 4 carbon atoms and of at least 4 fluorine atoms.

2. In a normally solid organic phase consisting essentially of asphalt containing a natural low molecular weight oleaginous material in the form of one of a solid solution, a gel and a colloidal suspension which has a tendency to migrate to the surface of said solid phase, the inclusion in said solid phase as an antimigration agent between about 5 and about 1000 parts per million of an organic compound having an oleophobic fluorine-containing terminal portion of at least 4 carbon atoms and of at least 4 fluorine atoms as an antimigration agent dissolved in said oleaginous material.

3. A normally solid organic phase consisting essentially of a normally solid asphalt phase containing a natural oleaginous material compatible with said asphalt phase and being liquefiable at a temperature at which said organic material is sold, whereby it has a tendency to migrate in said solid phase, and between about 5 and about 1000 parts per million of an organic compound soluble in said oleaginous material in the latter's liquid state having an oleophobic terminal portion of at least 4 carbon atoms and of at least 4 fluorine atoms.

4. A normally solid organic phase consisting essentially of an asphalt phase having a melting point of at least 50° C., containing between 1 and about 90 weight percent of a natural relatively lower molecular weight oleaginous material compatible with said asphalt phase and being liquefiable at a temperature at which said asphalt is solid, whereby it has a tendency to migrate to the surface of said solid phase, and between about 5 and about 1000 parts per million of an organic antimigration compound soluble in said natural lower molecular weight oleaginous material in the latter's liquid state having an oleophobic perhalogenated fluorine-containing organic terminal portion of at least 4 carbon atoms and of at least 4 fluorine atoms and having an oleophilic portion containing at least one hydrocarbon alkyl radical.

5. The composition of claim 4 in which said organic anti-migration compound has the empirical formula

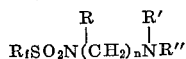

in which $R_f$ is a fluorinated alkyl radical having at least 4 carbon atoms, R is selected from the group consisting of a hydrocarbon alkyl radical of not more than 6 carbon atoms and hydrogen, R' and R'' are organic radicals of 1 to 12 carbon atoms and at least one of which is a hydrocarbon alkyl radical, and n is an integer from 1 to 6.

6. The composition of claim 4 in which said organic anti-migration compound has the empirical formula

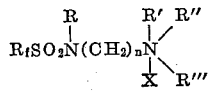

in which $R_f$ is a fluorinated alkyl radical having at least 4 carbon atoms, R is selected from the group consisting of a hydrocarbon alkyl radical of not more than 6 carbon atoms and hydrogen, R', R'' and R''' are organic radicals of 1 to 12 carbon atoms and at least one of which is a hydrocarbon alkyl radical, X is a halogen selected from the group consisting of bromine, iodine and chlorine, and n is an integer from 1 to 6.

7. The composition of claim 4 in which said organic anti-migration compound has the empirical formula

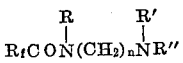

in which $R_f$ is a fluorinated alkyl radical having at least 4 carbon atoms, R is selected from the group consisting of a hydrocarbon alkyl radical of not more than 6 carbon atoms and hydrogen, R' and R'' are organic radicals of 1 to 12 carbon atoms and at least one of which is a hydrocarbon alkyl radical, and n is an integer from 1 to 6.

8. The composition of claim 4 in which said organic anti-migration compound has the empirical formula

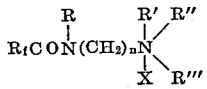

in which $R_f$ is a fluorinated alkyl radical having at least 4 carbon atoms, R is selected from the group consisting of a hydrocarbon alkyl radical of not more than 6 carbon atoms and hydrogen, R', R'' and R''' are organic radicals of 1 to 12 carbon atoms and at least one of which is a hydrocarbon alkyl radical, X is a halogen selected from the group consisting of bromine, iodine and chlorine, and n is an integer from 1 to 6.

9. The composition of claim 4 in which said organic anti-migration compound has the empirical formula

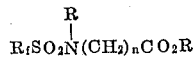

in which $R_f$ is a fluorinated alkyl radical having at least 4 carbon atoms, R is selected from the group consisting of a hydrocarbon alkyl radical of not more than 6 carbon atoms and hydrogen, and n is an integer from 1 to 6.

10. The composition of claim 4 in which said organic anti-migration compound has the empirical formula

in which $R_f$ is a fluorinated alkyl radical having at least 4 carbon atoms and R' is a hydrocarbon alkyl radical of 1 to 12 carbon atoms.

11. An asphalt roofing composition comprising a felt base containing inorganic roofing granules bonded thereon with a normally solid organic phase consisting essentially of asphalt containing a natural low molecular weight oleaginous material and between about 5 and about 1000 parts per million of an organic compound having an oleophobic fluorine-containing terminal portion of at least 4 carbon atoms and of at least 4 fluorine atoms as an anti-migration agent dissolved in said oleaginous material.

12. A paper asphalt laminate in which the asphalt phase consists essentially of an asphalt containing a natural low molecular weight oleaginous material and between about 5 and about 1000 parts per million of an organic compound having an oleophobic fluorine-containing terminal portion of at least 4 carbon atoms and of at least 4 fluorine atoms as an antimigration agent dissolved in said oleaginous material.

13. Asphalt linoleum or tile having a felt base upon which is bonded thereon an asphalt phase consisting essentially of an asphalt containing a natural low molecular weight oleaginous material and between about 5 and about 1000 parts per million of an organic compound having an oleophobic fluorine-containing terminal portion of at least 4 carbon atoms and of at least 4 fluorine atoms as an antimigration agent dissolved in said oleaginous material.

References Cited by the Examiner

UNITED STATES PATENTS

| | | | |
|---|---|---|---|
| 2,276,155 | 3/1942 | Carr | 208—45 XR |
| 2,465,960 | 3/1949 | Van den Berge | 106—273 |
| 2,732,398 | 1/1956 | Brice et al. | 260—503 |
| 2,755,223 | 7/1956 | Illman | 196—22 |
| 2,759,019 | 8/1956 | Brown et al. | 260—556 |
| 2,803,656 | 7/1957 | Ahlbrecht | 260—536 |
| 2,809,990 | 10/1957 | Brown | 260—534 |
| 3,096,191 | 7/1963 | Pitchford | 106—275 |

OTHER REFERENCES

Abraham: Asphalts and Allied Substances, fifth edition, volume one, New York, D. Van Nostrand Company, Inc., 1954 (pages 60 and 67 relied upon).

ALEXANDER H. BRODMERKEL, *Primary Examiner.*

JOSEPH REBOLD, MORRIS LIEBMAN, *Examiners.*

UNITED STATES PATENT OFFICE
CERTIFICATE OF CORRECTION

Patent No. 3,245,817                                                 April 12, 1966

Donald E. Lovness

It is hereby certified that error appears in the above numbered patent requiring correction and that the said Letters Patent should read as corrected below.

Columns 5 and 6, Table I, second column, line 7 thereof, for "$C_7F_{15}CONHC_3H_6N(CH_3)_2(C_2H_4COCH=CH_2)Cl$" read -- $C_7F_{15}CONHC_3H_6N(CH_3)_2(C_2H_4OCOCH=CH_2)Cl$ --; columns 9 and 10, Table VI, first column, line 7 thereof, for "$C_7F_{15}CONHC_3H_6N(CH_3)_2(C_2H_4COCH=CH_2)Cl$" read -- $C_7F_{15}CONHC_3H_6N(CH_3)_2(C_2H_4O\overset{O}{\underset{\|}{C}}CH=CH_2)Cl$ --; column 11, line 13, for "sold" read -- solid --; line 21, after "between" insert -- about --; same column 11, lines 36 to 38, the formula should appear as shown below instead of as in the patent:

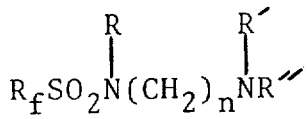

Signed and sealed this 27th day of September 1966.

(SEAL)
Attest:

ERNEST W. SWIDER                                    EDWARD J. BRENNER
Attesting Officer                                  Commissioner of Patents